United States Patent
Hu et al.

(10) Patent No.: US 9,311,075 B2
(45) Date of Patent: Apr. 12, 2016

(54) ELECTRONIC APPARATUS AND BIOS UPDATING APPARATUS THEREOF

(71) Applicants: Chih-Wei Hu, New Taipei (TW); Lin-Hung Chen, New Taipei (TW)

(72) Inventors: Chih-Wei Hu, New Taipei (TW); Lin-Hung Chen, New Taipei (TW)

(73) Assignee: ASMedia Technology Inc., New Taipei (TW)

( * ) Notice: Subject to any disclaimer, the term of this patent is extended or adjusted under 35 U.S.C. 154(b) by 268 days.

(21) Appl. No.: 13/671,569

(22) Filed: Nov. 8, 2012

(65) Prior Publication Data

US 2013/0159692 A1 Jun. 20, 2013

(30) Foreign Application Priority Data

Dec. 16, 2011 (TW) ............................ 100146891 A

(51) Int. Cl.
*G06F 9/00* (2006.01)
*G06F 9/445* (2006.01)
(52) U.S. Cl.
CPC ....................................... *G06F 8/67* (2013.01)
(58) Field of Classification Search
CPC ..................................... G06F 9/00; G06F 8/67
USPC ............................................................ 712/3
See application file for complete search history.

(56) References Cited

U.S. PATENT DOCUMENTS

| 2003/0076311 | A1 | 4/2003 | Lin et al. |
| 2006/0059330 | A1* | 3/2006 | Ong et al. ................ 713/2 |
| 2009/0240934 | A1 | 9/2009 | Chou |
| 2011/0113181 | A1* | 5/2011 | Piwonka et al. ........... 711/102 |

FOREIGN PATENT DOCUMENTS

| CN | 101894054 | 11/2010 |
| CN | 102053875 | 5/2011 |

* cited by examiner

*Primary Examiner* — Jaweed A Abbaszadeh
*Assistant Examiner* — Austin Hicks
(74) *Attorney, Agent, or Firm* — Jianq Chyun IP Office

(57) ABSTRACT

An electronic apparatus including a central processing unit (CPU), a chipset, a first interface circuit, a temporary memory, a BIOS (basic input/output system) memory, a second interface circuit and a first switcher is provided. The chipset is coupled to the CPU and the first switcher. The temporary memory is coupled to the first switcher and the first interface circuit. The first interface circuit is coupled to the electronic apparatus and an extended storage including a first BIOS. The second interface circuit is coupled to the first switcher and the BIOS memory. If the first BIOS is stored in the temporary memory, the temporary memory is coupled to the chipset by the first switcher; if the first BIOS is not stored in the temporary memory, the second interface circuit is coupled to the chipset by the first switcher. The electronic device can safely updates the BIOS.

10 Claims, 1 Drawing Sheet

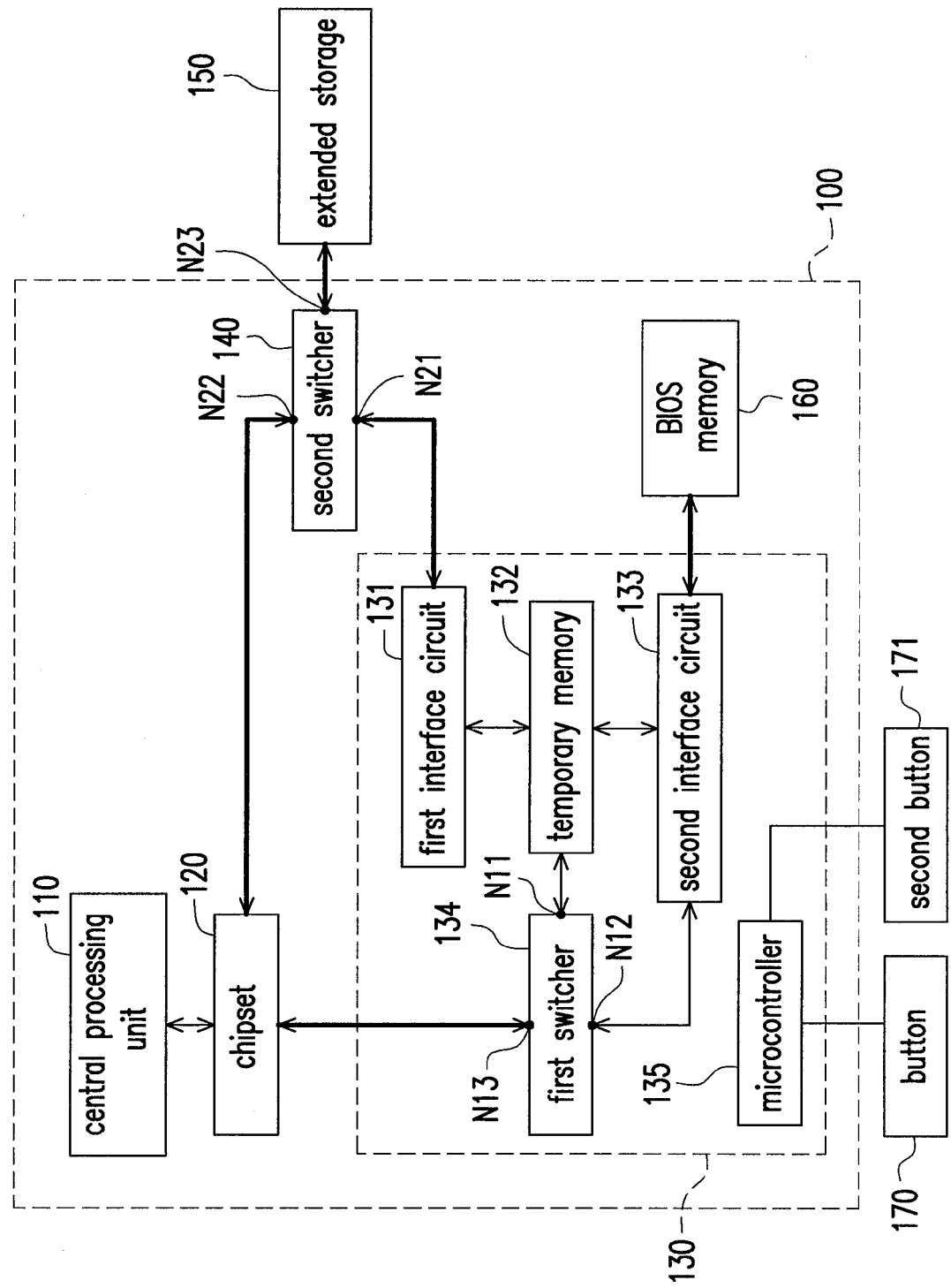

ELECTRONIC APPARATUS AND BIOS UPDATING APPARATUS THEREOF

CROSS-REFERENCE TO RELATED APPLICATION

This application claims the priority benefit of Taiwan application serial no. 100146891, filed on Dec. 16, 2011. The entirety of the above-mentioned patent application is hereby incorporated by reference herein and made a part of this specification.

BACKGROUND OF THE INVENTION

1. Field of the Invention

The invention relates to an electronic apparatus, and more particularly to an electronic apparatus having a basic input/output system (BIOS).

2. Description of Related Art

In a computer system, a motherboard has a basic input/output system (thereafter BIOS) of its own. The code of the BIOS is generally stored in a BIOS memory on the motherboard. In general, the BIOS memory is a non-volatile memory, for example, a read-only memory (ROM) and so on. Currently, the first action that most computer systems perform when booting is to run the BIOS code stored in the BIOS memory using a central processing unit (CPU), which means that the BIOS is activated for the completion of booting.

Currently, all computer systems allow a user to update the BIOS code. However, when the BIOS is being abnormal (for example, due to a failed update or a wrong version and so on), the computer system is unable to operate. At this moment, the computer system has to be sent for repairs, so as for the BIOS memory to be removed from the motherboard and for the BIOS code to be programmed again.

In addition, after the update of the BIOS is completed, sometimes the user changes his/her mind or is unsatisfied with the updated BIOS. Since the original BIOS code in the BIOS memory has been erased, the user can not have the computer system recall the original version of BIOS.

Moreover, during the process in which the user repeatedly tries out new BIOS codes, frequent erase and update performed to the BIOS memory also decreases the life of the BIOS memory dramatically.

SUMMARY OF THE INVENTION

The application provides a basic input/output system (BIOS) updating apparatus, including a first interface circuit, a temporary memory, a second interface circuit and a first switcher. The temporary memory is coupled to the first interface circuit. When an extended storage is connected to the first interface circuit, a first BIOS in the extended storage is stored in the temporary memory by the first interface circuit. The second interface circuit is connected to a BIOS memory, wherein the BIOS memory has a second BIOS. A first selection terminal of the first switcher is coupled to the temporary memory. A second selection terminal of the first switcher is coupled to the second interface circuit. A common terminal of the first switcher is coupled to a chipset. If the first BIOS is stored in the temporary memory, then the temporary memory is coupled to the chipset by the first switcher; if the first BIOS is not stored in the temporary memory, then the second interface circuit is coupled to the chipset by the first switcher.

The application also provides an electronic apparatus, including a central processing unit (CPU), a chipset, a first interface circuit, a temporary memory, a basic input/output system (BIOS) memory, a second interface circuit and a first switcher. The chipset is coupled to the CPU. The temporary memory is coupled to the first interface circuit. When an extended storage is connected to a first interface circuit, a first BIOS in the extended storage is stored in the temporary memory by the first interface circuit. The BIOS memory has a second BIOS. The second interface circuit is coupled to the BIOS memory. A first selection terminal of the first switcher is coupled to the temporary memory. A second selection terminal of the first switcher is coupled to the second interface circuit. A common terminal of the first switcher is coupled to the chipset. If the first BIOS is stored in the temporary memory, then the temporary memory is coupled to the chipset by the first switcher; if the first BIOS is not stored in the temporary memory, then the second interface circuit is coupled to the chipset by the first switcher According to the aforementioned, an updating apparatus in an embodiment of the application can read a first BIOS in an extended storage via a first interface circuit, and can judge if the first BIOS being read is valid. If the first BIOS is valid, then the first BIOS is stored in a temporary memory by a first interface circuit and a temporary memory is coupled to a chipset by a first switcher. Therefore, in the first boot after the first BIOS is installed in the temporary memory, a CPU can read/run the first BIOS stored in the temporary memory through the chipset and the first switcher. Once the first BIOS is confirmed to be a BIOS to be updated, then the first BIOS which is from the extended storage and stored in the temporary memory is updated to the BIOS memory, so as to replace a second BIOS in the BIOS memory.

Therefore, the updating apparatus in the embodiment of the invention can avoid abnormality resulted from a wrong version and allow a user to have an original version of BIOS back if the user changes his/her mind or is unsatisfied with an updated BIOS. Moreover, the updating apparatus in the embodiment of the invention can reduce the frequency of updating the BIOS memory so that the life of the BIOS memory lasts longer.

In order to make the aforementioned features and advantages of the invention more comprehensible, embodiments accompanying figures are described in detail below.

BRIEF DESCRIPTION OF THE DRAWINGS

FIG. 1 is a block diagram illustrating an electronic apparatus according to an embodiment of the invention.

DESCRIPTION OF EMBODIMENTS

FIG. 1 is a block diagram illustrating an electronic apparatus according to an embodiment of the invention. An electronic apparatus 100 may be a computer system or any other apparatuses having a basic input/output system (thereafter BIOS). Please refer to FIG. 1, the electronic apparatus 100 includes a central processing unit (CPU) 110, a chipset 120, an updating apparatus 130, a second switcher 140, an extended storage 150, a BIOS memory 160, a button 170 and a second button 171, wherein the extended storage 150 has a first BIOS and the BIOS memory 160 has a second BIOS. In addition, the updating apparatus 130 includes a first interface circuit 131, a temporary memory 132, a second interface circuit 133, a first switcher 134 and a microcontroller (MC) 135.

To be specific, the first interface circuit 131 provides an access interface between the electronic apparatus 100 and the extended storage 150. The temporary memory 132 is coupled to the first interface circuit 131. The second interface circuit 133 provides an access interface between the updating apparatus 130 and the BIOS memory 160. A first selection terminal N11 of the first switcher 134 is coupled to the temporary memory 132. A second selection terminal N12 of the first switcher 134 is coupled to the second interface circuit 133. A common terminal N13 of the first switcher 134 is coupled to the chipset 120. A first selection terminal N21 of the second switcher 140 is coupled to the first interface circuit 131. A second selection terminal N22 of the second switcher 140 is coupled to the chipset 120. A common terminal N23 of the second switcher 140 is coupled to the extended storage 150. The chipset 120 is coupled to the CPU 110. Besides, the microcontroller 135 is coupled to the button 170 and the second button 171.

Generally speaking, there is no BIOS in the temporary memory 132. Therefore, the second interface circuit 133 is connected to the chipset 120 by the first switcher 134. That is, the BIOS memory 160 is connected to a BIOS memory connection port of the chipset 120 by the updating apparatus 130. As a result, generally the electronic apparatus 100 runs a second BIOS in the BIOS memory 160.

The chipset 120 can be in either a normal mode or an disable mode according to a power management mode of the electronic apparatus 100. When the electronic apparatus 100 is in an on-mode condition, the chipset 120 is in a normal mode. Then, the extended storage 150 is coupled to the chipset 120 by the second switcher 140. The extended storage 150 transmits data only to the chipset 120. At this moment, the updating apparatus 130 does not read the first BIOS in the extended storage 150.

When the electronic apparatus 100 is in an off-mode condition or a sleep-mode condition, the chipset 120 is in an disable mode. A user may trigger/activate the updating apparatus 130 and the microcontroller 135 by pressing the button 170. At this moment, the microcontroller 135 controls the second switcher 140, and then the extended storage 150 is coupled to the first interface circuit 130 by the second switcher 140. In the embodiment, the extended storage 150 may be any kinds of data storage, for example, a universal serial bus (thereafter USB) storage, a secure digital (SD) memory card or other kinds of data storages. If the extended storage 150 is the USB storage, then the first interface circuit 131 can be a USB host controller. If the extended storage 150 is a memory card, then the first interface circuit 131 can be a card reader circuit.

Therefore, through pressing the button 170, the extended storage 150 can be accessed by the updating apparatus 130, wherein the button 170 may be, for example, an exterior button disposed on the electronic apparatus 100, or a key on a computer keyboard which can activate the microcontroller 135 to proceed with a updating process after a user long-presses the button 170 for about 3 to 5 seconds. In other words, when the chipset 120 is in an disable mode and after a user presses the button 170, the updating apparatus 130 can read the first BIOS in the extended storage 150 via the first interface circuit 131.

When the first interface circuit 131 reads the first BIOS in the extended storage 150, the microcontroller 135 (or the first interface circuit 131) can perform a check on the first BIOS to judge if the first BIOS is valid to be able to match the electronic apparatus 100. If the first BIOS is valid, then the microcontroller 135 controls the first interface circuit 131, and then the first BIOS is stored in the temporary 132 by the first interface circuit 131. For example, the microcontroller 135 may control the first interface circuit 131 which performs a cyclic redundancy check (CRC) to judge if the file name, format and version of the data in the first BIOS matches the electronic apparatus 100.

It is worth mentioning that the temporary memory 132 is a volatile memory. That is, after the electronic apparatus 100 is turned off and when the updating apparatus 130 is not triggered, the first BIOS stored in the temporary memory 132 disappears.

In addition, once the first BIOS in the extended storage 150 is stored in the temporary memory 132 by the first interface circuit 131, the microcontroller 135 controls the first switcher 134, and then the temporary memory 132 is coupled to the BIOS memory connection port of the chipset 120 by the first switcher 134.

Specifically, if the first BIOS in the extended storage 150 is judged to be valid by the microcontroller 135 and to be able to match the electronic apparatus 100, at this moment, a light-emitting diode (LED) display light (not shown) in the electronic apparatus 100 illuminates to show a user that the first BIOS in the extended storage 150 is valid. Apart from that, the temporary memory 132 is coupled to the chipset 120 by the first switcher 134. Therefore, when the chipset 120 turns to a normal mode from an disable mode, for example, after the electronic apparatus 100 boots, the chipset 120 may read the first BIOS in the temporary memory 132. That is, the electronic apparatus 100 may boot with the first BIOS in the temporary memory 132 and the user can try out the first BIOS.

The user can give an updating command to choose if the first BIOS is to be kept. If the user chooses to keep the first BIOS in the temporary memory 132 after trying out the first BIOS, the microcontroller 135 activates the second interface circuit 133 according to the updating command, so as to write the first BIOS in the temporary memory 132 into the BIOS memory 160 to replace the second BIOS previously exists in the BIOS memory 160.

The source of a given command described in the embodiment includes an application in the electronic apparatus 100 and/or the second button 171. That is, for example, when the chipset 120 is in a normal mode (meaning that after the electronic apparatus 100 boots), the user may give an updating command via the application in the electronic apparatus 100, so as to update the first BIOS in the temporary memory 132 to the BIOS memory 160. Or, the user may trigger the microcontroller 135 through pressing the second button 171 to forcefully make the microcontroller 135 control the second interface circuit 133, and the first BIOS in the temporary memory 132 is updated to the BIOS memory 160 by the second interface circuit 133.

However, after booting, if the user does not give an updating command, or if the user gives a back command, then the first BIOS in the temporary memory 132 is not written into the BIOS memory 160 via the second interface circuit 133; the second interface circuit 133 is coupled to the BIOS memory connection port of the chipset 120 by the first switcher 134. Since the temporary memory 132 is a kind of volatile memory, during next booting, the first BIOS in the temporary memory 132 is cleaned. Besides, the chipset 120 still reads the second BIOS previously exists in the BIOS memory 160. In other embodiments, the user can also give a back/clean command via the application, making the microcontroller 135 clean the first BIOS in the temporary memory 132.

However, if the first BIOS in the extended storage 150 is judged to be invalid by the microcontroller 135 or to be unable to match the electronic apparatus 100, then the second interface circuit 133 is coupled to the chipset 120 by the first switcher 134. Therefore, after the electronic apparatus 100 boots and when the chipset 120 is in a normal mode, the first BIOS does not replace the second BIOS previously exists in the BIOS memory 160, and the chipset 120 still reads the second BIOS previously exists in the BIOS memory 160.

In summary, the application provides the updating apparatus and the electronic apparatus which can read a BIOS in the extended storage, judge if the BIOS being read matches a system of the electronic apparatus and provide the user with choices, so that the user can decide whether to replace the BIOS in the electronic apparatus with the BIOS being read by the extended storage so as to update the BIOS. Thereby, the user can read the BIOS on the extended storage without downloading the BIOS from the Internet or reading the BIOS on a compact disk. Furthermore, if the user tries out the BIOS and confirms the BIOS to be valid, the user can choose whether to use the BIOS in the extended storage for an update, so as to avoid updating errors of BIOS.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A basic input/output system (BIOS) updating apparatus suitable for an electronic apparatus which has a BIOS memory and a chipset, comprising:
   a first interface circuit;
   a volatile memory coupled to the first interface circuit, when an extended storage is connected to the first interface circuit, the chipset is in a disable mode, and a first BIOS in the extended storage is stored in the volatile memory by the first interface circuit;
   a second interface circuit connected to the BIOS memory, wherein the BIOS memory has a second BIOS, wherein the first BIOS and the second BIOS are independent BIOSes; and
   a first switcher including three selection terminals, a first selection terminal coupled to the volatile memory, a second selection terminal coupled to the second interface circuit, and a common terminal coupled to the chipset, respectively;
   wherein the BIOS memory and the extended storage are independent storages, and when the first BIOS is stored in the volatile memory, the volatile memory is coupled to the chipset by the first switcher; when the first BIOS is not stored in the volatile memory, the second interface circuit is coupled to the chipset by the first switcher.

2. The BIOS updating apparatus according to claim 1, further comprising a button, when the button is pressed, the first BIOS in the extended storage is transmitted to the volatile memory by the first interface circuit.

3. The BIOS updating apparatus according to claim 1, when the extended storage is connected to the first interface circuit, the BIOS updating apparatus further comprising a microcontroller confirming if the first BIOS is valid for the first BIOS to be stored in the volatile memory.

4. The BIOS updating apparatus according to claim 3, further comprising a second button, when the second button is pressed, the second BIOS in the BIOS memory is updated with the first BIOS.

5. The BIOS updating apparatus according to claim 1, wherein the first interface circuit includes a universal serial bus (USB) host controller, and the extended storage is a USB storage.

6. An electronic apparatus, comprising:
   a central processing unit (CPU);
   a chipset coupled to the CPU;
   a first interface circuit;
   a volatile memory coupled to the first interface circuit, when an extended storage is connected to the first interface circuit, then a first BIOS in the extended storage is stored in the volatile memory by the first interface circuit;
   a BIOS memory having a second BIOS, wherein the first BIOS and the second BIOS are independent BIOSes;
   a second interface circuit coupled to the BIOS memory;
   a first switcher, a first selection terminal of the first switcher coupled to the volatile memory, a second selection terminal of the first switcher coupled to the second interface circuit, a common terminal of the first switcher coupled to the chipset, and;
   a second switcher, a first selection terminal of the second switcher coupled to the first interface circuit, a second selection terminal of the second switcher coupled to the chipset, a common terminal of the second switcher couples to the extended storage;
   when the chipset is in a normal mode, the extended storage is coupled to the chipset by the second switcher when the chipset is in a disable mode the extended storage is coupled to the first interface circuit by the second switcher,
   wherein the BIOS memory and the extended storage are independent storages, and when the first BIOS is stored in the volatile memory, the volatile memory is coupled to the chipset by the first switcher; when the first BIOS is not stored in the volatile memory, the second interface circuit is coupled to the chipset by the first switcher.

7. The electronic apparatus according to claim 6, further comprising a button, when the button is pressed, the first BIOS in the extended storage is transmitted to the volatile memory by the first interface circuit.

8. The electronic apparatus according to claim 6, when the extended storage is connected to the first interface circuit, the BIOS updating apparatus further comprising a microcontroller confirming if the first BIOS is valid, then the first BIOS is stored in the volatile memory.

9. The electronic apparatus according to claim 8, further comprising a second button, when the second button is pressed, the second BIOS in the BIOS memory is updated with the first BIOS.

10. The electronic apparatus according to claim 6, wherein the first interface circuit comprises a USB host controller, and the extended storage is a USB storage.

* * * * *